No. 794,756. PATENTED JULY 18, 1905.
S. VAN BRUGGEN.
SEED TESTER.
APPLICATION FILED APR. 12, 1904.
2 SHEETS—SHEET 1.
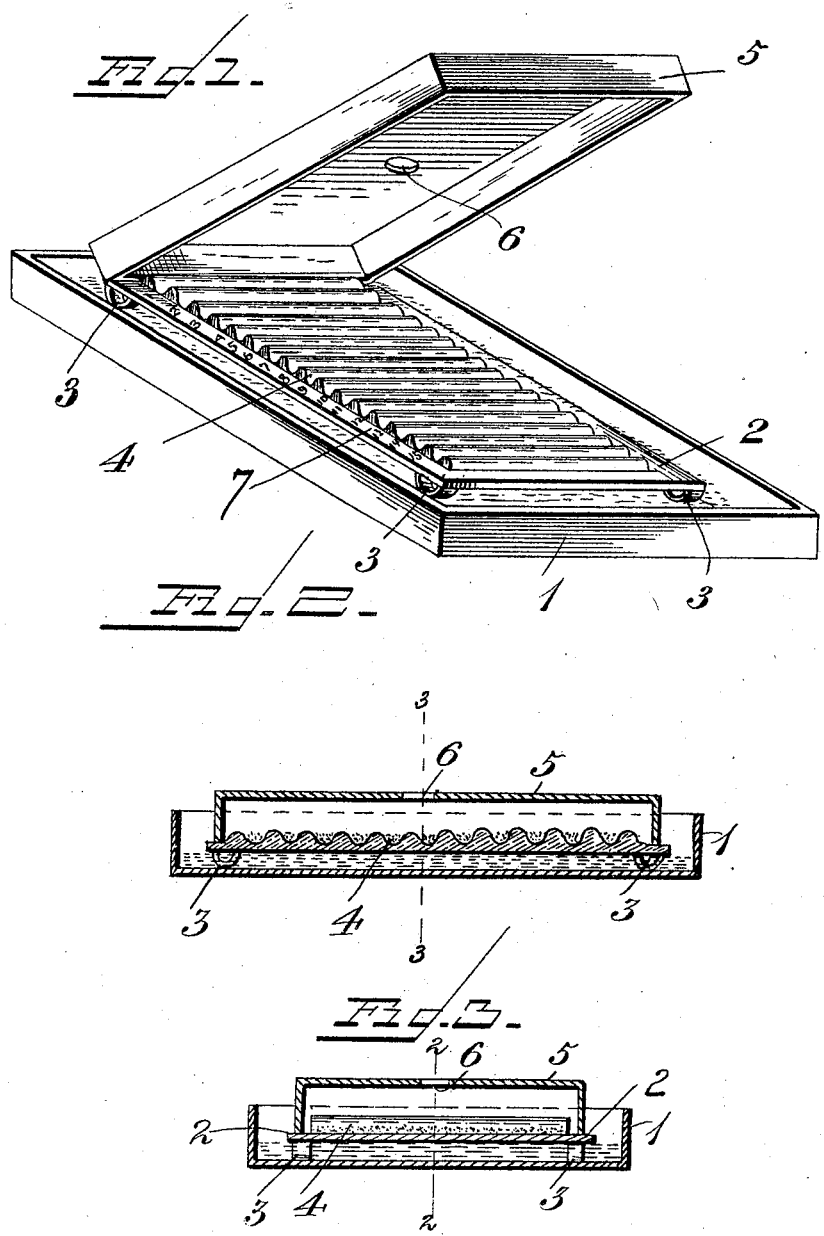

No. 794,756. PATENTED JULY 18, 1905.
S. VAN BRUGGEN.
SEED TESTER.
APPLICATION FILED APR. 12, 1904.
2 SHEETS—SHEET 2.
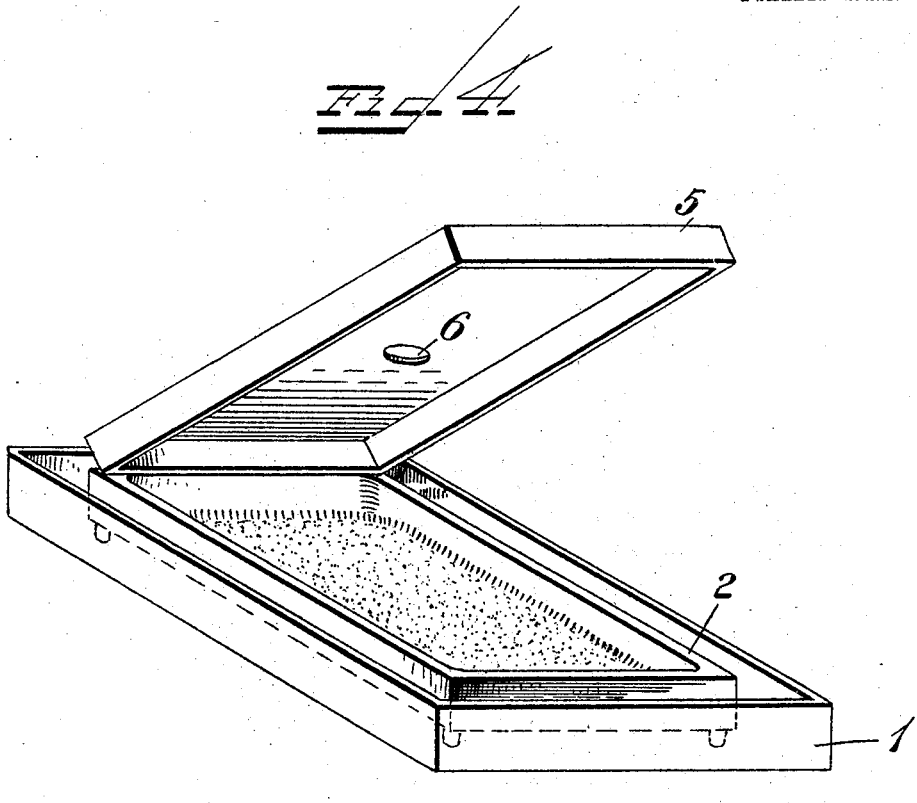
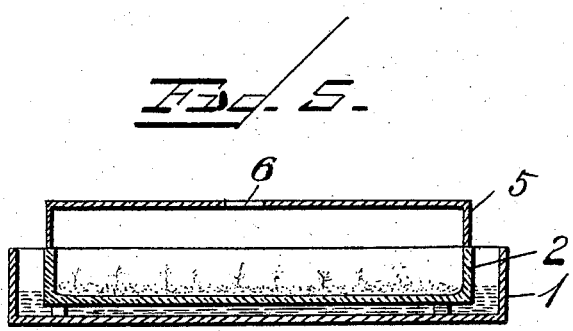

No. 794,756. Patented July 18, 1905.

UNITED STATES PATENT OFFICE.

SIMON VAN BRUGGEN, OF PATERSON, NEW JERSEY.

SEED-TESTER.

SPECIFICATION forming part of Letters Patent No. 794,756, dated July 18, 1905.

Application filed April 12, 1904. Serial No. 202,787.

*To all whom it may concern:*

Be it known that I, SIMON VAN BRUGGEN, a citizen of the United States, residing at Paterson, in the county of Passaic and State of New Jersey, have invented certain new and useful Improvements in Seed-Testers, of which the following is a specification.

My invention relates to a seed-tester or seed-germinating device, the object of the same being to test the germinating quality of the seeds to see that they are good and also to sprout them for early planting and the like; and it consists mainly in a tank or receptacle for the water, a seed-receptacle, and cover.

In the drawings forming a part of this specification, and in which like symbols of reference represent corresponding parts in the several views, Figure 1 is a perspective view of my device. Fig. 2 is a longitudinal section of the same on line 2 2, Fig. 3; Fig. 3, a transverse section on line 3 3, Fig. 2; Fig. 4, a perspective view of a modification, and Fig. 5 a transverse section of modification.

1 represents the water tank or receptacle, in which the seed-receptacle 2 rests and is supported by feet 3, said seed-receptacle having a waved or corrugated surface, so as to form recesses or channels 4.

5 is the top for the seed-receptacle, the same being formed, preferably, with a vent or opening 6 for air. On the sides of the seed-receptacle is formed a smooth margin or border 7, upon which a series of numbers or other marks is placed, the same corresponding to the recesses or channels 4, the object of the same being to keep a register of the various kinds of seeds placed in said recesses, for, be it understood, the object of said recesses is to test any number or kind of seeds desired. In connection with said numbers a tally is kept in a book or slip of paper, (not shown,) so that the experimenter will know exactly what seeds are being tested. This form of the device is intended more particularly for any kinds of small seeds, such as lettuce or the like; but of course it may be used for any sized seed. The seeds are preferably placed with the germinating ends downward.

In the modification shown in Figs. 4 and 5 the seed-receptacle 2 is formed with a dish-like center or bottom instead of the recesses shown in the other form, the object of the same being to sprout a quantity of one kind of seed for the purpose of early planting in the garden.

The box or receptacle 1 should be filled with warm water morning and evening, with the atmosphere of the room not below 65° Fahrenheit.

The pan or receptacle 1 is preferably zinc or tin, while the seed-receptacle and cover are preferably formed of some porous material, such as earthenware or the like.

Having now fully described my invention, what I claim as new, and desire to secure by Letters Patent, is—

1. In a seed-germinator, a water-receptacle, a seed-receptacle formed with a waved surface and adapted to be supported above the water-receptacle, and a cover having an air-vent.

2. In a seed-germinator, a water-receptacle, a seed-receptacle provided with feet to hold it above the water-receptacle, and a cover provided with an air-vent, substantially as described.

In testimony whereof I affix my signature in presence of two witnesses.

SIMON VAN BRUGGEN.

Witnesses:
  ADRIANUS DALE,
  CORNELIUS BOSLANDS.